Figure 1:
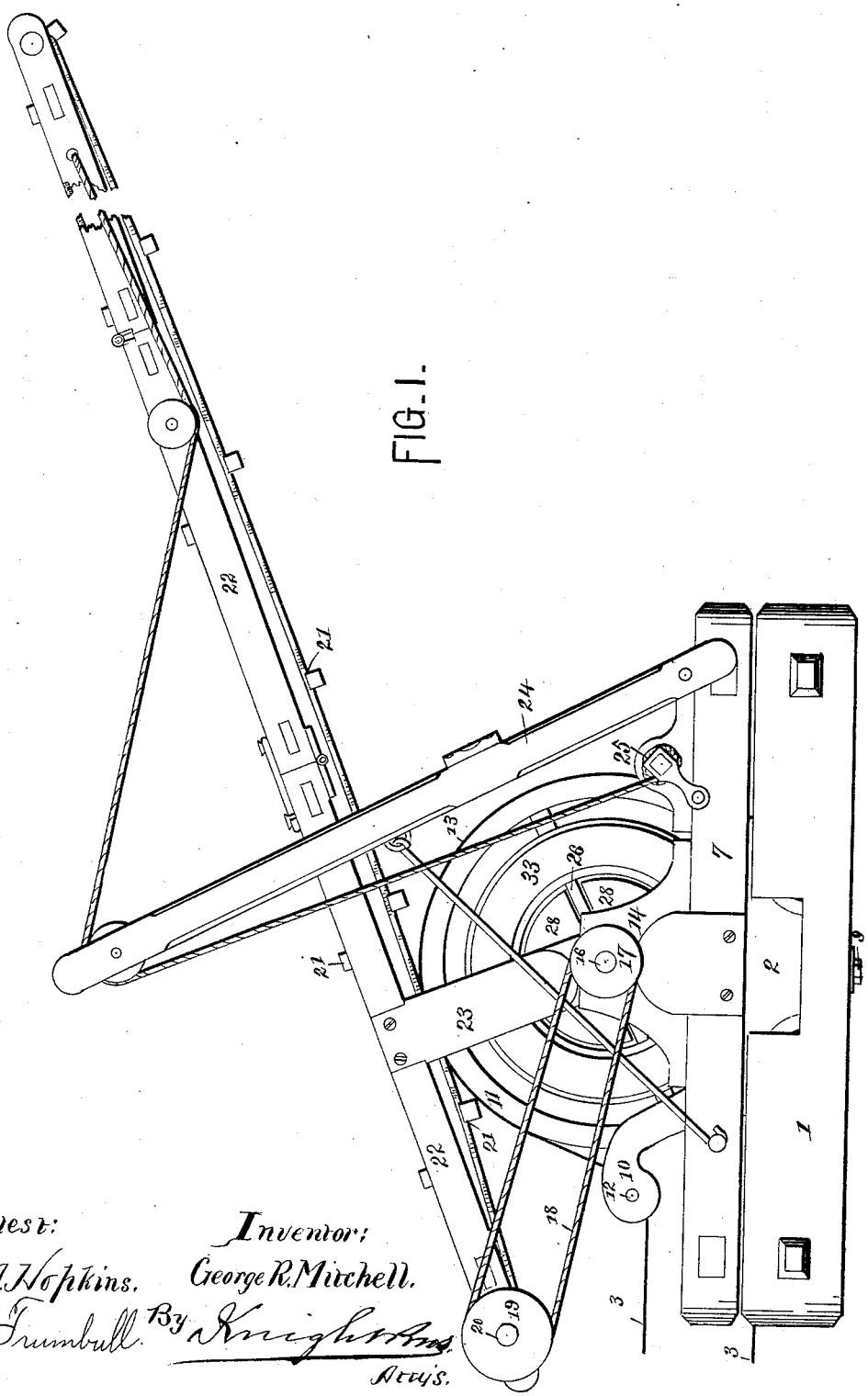

(No Model.)　　　　　　　　　　　　　　　　　　3 Sheets—Sheet 1.
G. R. MITCHELL.
DEVICE FOR TRANSMITTING MOTION.

No. 341,596.　　　　　　　　　　Patented May 11, 1886.

Attest:
F. A. Hopkins.
A. E. Trumbull.

Inventor:
George R. Mitchell.
By Knight Bros.
Att'ys.

(No Model.)  G. R. MITCHELL.  3 Sheets—Sheet 2.
DEVICE FOR TRANSMITTING MOTION.
No. 341,596.  Patented May 11, 1886.
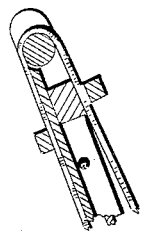
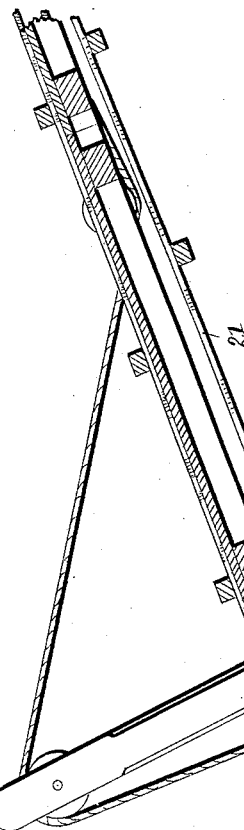
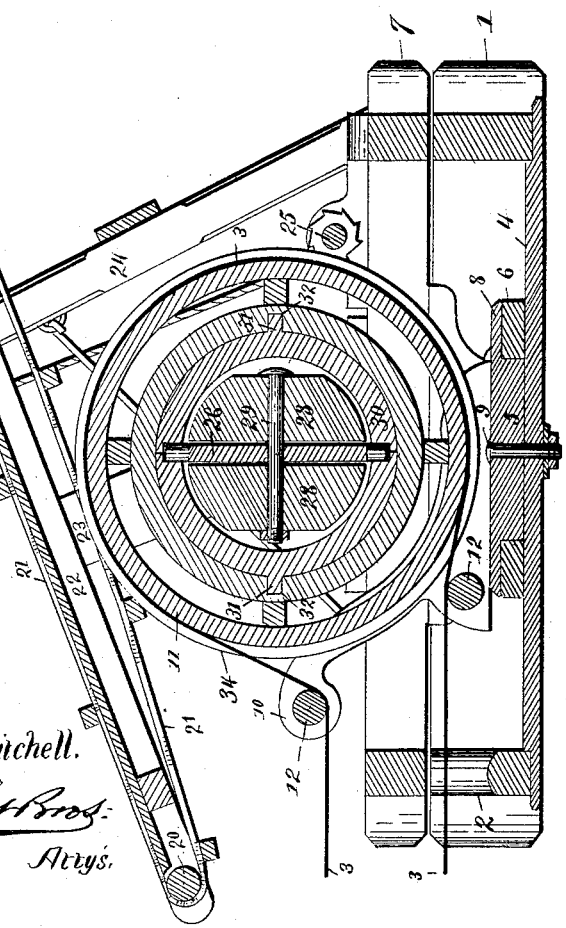
FIG. 11.
Attest:
F. A. Hopkins.
A. E. Trumbull.
Inventor:
George R. Mitchell.
By Knight Bros.
Att'ys.

(No Model.) 3 Sheets—Sheet 3.
G. R. MITCHELL.
DEVICE FOR TRANSMITTING MOTION.
No. 341,596. Patented May 11, 1886.
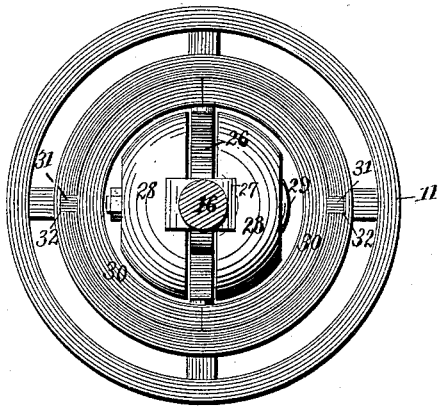
FIG. IV.
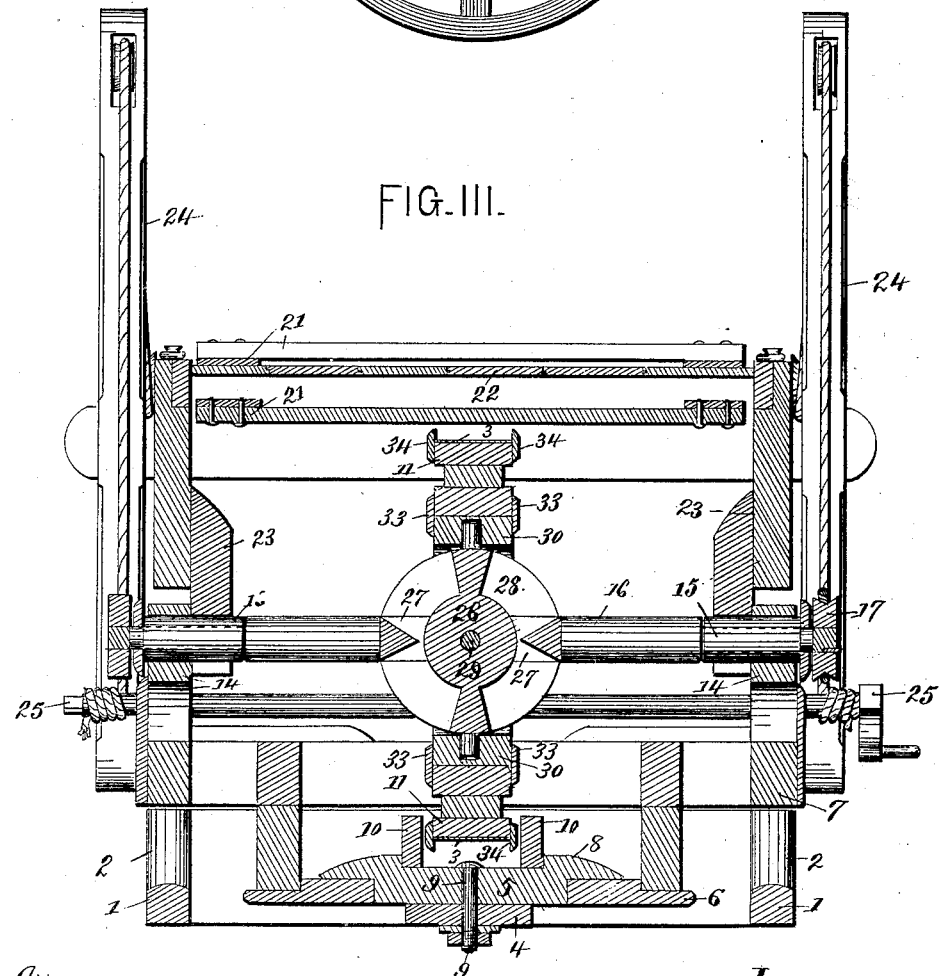
FIG. III.
Attest:
F. A. Hopkins.
A. E. Trumbull.
Inventor:
George R. Mitchell,
By Knight Bros
Atty's.

UNITED STATES PATENT OFFICE.

GEORGE R. MITCHELL, OF CHILLICOTHE, OHIO, ASSIGNOR OF ONE-THIRD TO WILLIAM L. MILLER, OF SAME PLACE.

DEVICE FOR TRANSMITTING MOTION.

SPECIFICATION forming part of Letters Patent No. 341,596, dated May 11, 1886.

Application filed September 15, 1885. Serial No. 177,196. (No model.)

*To all whom it may concern:*

Be it known that I, GEORGE R. MITCHELL, a citizen of the United States, residing at Chillicothe, in the county of Ross and State of Ohio, have invented certain new and useful Improvements in Devices for Transmitting Motion, of which the following is a specification.

The invention relates to mechanism for transmitting power from a belt and pulley to a shaft, or vice versa, in which the connections must be of such flexibility as to allow of the shifting of one member relatively to the other without interfering with the transmission of motion.

I have shown and described my invention applied to a straw-stacker, as this belongs to a class of machines to which it is particularly adapted, although it is by no means limited thereto, but may be used in any machine where a similar object is sought to be accomplished. To this end I employ for transmitting power to the apron-operating shaft a pulley connected thereto by universal joint and adapted to receive motion from the thrasher or from the stacker thereon by belt. The universal joint consists of a bar pivoted in the pulley, and passing transversely through a slot in the shaft, within which it is retained centrally by a pin or bolt. The sides of the slot in the shaft are extended by the addition of rounded cheek-pieces, so as to bear upon the pivot-bar throughout its whole length, rendering the construction stronger and its operation more regular.

The invention further relates to means for supporting and guiding the belt to the pulley above described. For this purpose ways are provided in the base-frame, through which the belt may pass, whatever the position of the pivotal stacker-frame, and idle-rollers are mounted on brackets from the base-frame to receive the belt. The driving-shaft of the stacker-apron is mounted in sleeves in the pivotal frame, and the arms or standards supporting the stacker are pivoted on such sleeves and made of sufficient length to hold the stacker above the driving-pulley. Upon the same pivotal frame is mounted a crane and windlass for raising and lowering the outer end of the stacker.

In order that my invention may be fully understood, I will proceed to describe it with reference to the accompanying drawings, in which—

Figure I is a side elevation of a straw-stacker, showing my invention applied thereto. Fig. II is a longitudinal vertical section thereof. Fig. III is a transverse vertical section through the shaft, the stacker being horizontal. Fig. IV is a face view of the pulley with covering-rings removed.

1 represents a rectangular or other shaped base-frame, having cut-away portion 2 on three sides for the belt 3. On the central bar, 4, of frame 1 is fixed a disk, 5, surmounting and pivoting on which is a yoke, 6, supporting the frame 7. The yoke is retained upon the pivot 5 by plate 8, clamped rigidly to the base-frame by bolt 9. To the plate 8 are fixed brackets 10 10, which retain the driving-pulley 11 between them, compelling it to rotate constantly in the same plane, and which support idle-rollers 12, for guiding the belt 3 to said pulley. The belt may receive motion from any desired source, which I have not shown, as it forms no part of my present invention.

The pivotal frame 7 has brackets 14, carrying sleeves 15, forming bearings for the journals of the shaft 16, to which is keyed pulley 17, having belt 18, for driving the pulley 19 on roller 20, over which passes the apron 21 of the stacker 22. Arms 23, fixed to the under side of the stacker, are bifurcated to rest on the inwardly-projecting ends of sleeves 15, from which the stacker is thus supported. The outer end of the stacker is raised and lowered by crane 24, hinged to the frame 7, and windlass 25, journaled on said frame.

While the pulley 11 must be held from deflection from parallelism with its driving-belt, the shaft 16 must, while receiving rotation from the said pulley, be allowed capacity for deflection from the mechanical axis of said pulley, to enable it to accompany its supporting-frame 7 when swung with the stacker from side to side. For this purpose I provide a universal joint between the said shaft and pulley, consisting of a bar, 26, pivoted at each end in the pulley-rim, and occupying a slot, 27, in the shaft 16. In order to prolong the bearing of the bar 26 in the shaft, I apply to the sides of the slot in the latter rounded cheek-pieces 28. A bolt or pin, 29, serves to hold these various parts in proper position, while not interfering with the oscillation of the pulley on the shaft.

Preferably a dovetailed pin and groove are employed for fixing the cheeks 28 to the shaft, so that on removing bolt 29 the cheeks may be readily taken off by being forced longitudinally of the shaft.

The bar 26 is preferably applied to the pulley by providing a two-part ring, 30, in bearings on whose meeting faces the ends of the bar are placed previously to the forcing of the ring into the pulley, where it is held by teeth 31 and notches 32 from rotary movement relatively to the pulley.

Rings 33 33 cover the joints between ring 30 and the pulley, while rings 34 34, which may, if desired, be formed in one with the body of the pulley, retain the belt on the periphery thereof.

Having thus described my invention, the following is what I claim as new therein and desire to secure by Letters Patent:

1. The combination of a base-frame, a frame surmounting and pivoted to the base-frame, a shaft journaled in said surmounting frame and having a pulley fixed thereto, a pulley secured to said shaft by universal connection, a belt passed over said pulley, and fixed guiding-brackets secured to the base-frame, between which said pulley revolves, substantially as and for the purposes set forth.

2. The combination, with a pivoted frame, a shaft journaled therein, and a pulley having universal connection with said shaft, of a base-frame having cut-away portions and a belt, all constructed and arranged to operate substantially as set forth.

3. In combination with a shaft, a driving-pulley thereon and a pivot-bar in said pulley occupying a slot in said shaft, substantially as set forth.

4. In combination with a shaft, a driving-pulley thereon, pivot-bar in said pulley occupying a slot in said shaft, and cheek-pieces on said shaft on each side of said bar, substantially as set forth.

5. In combination with a slotted shaft and a pulley having pivot-bar arranged to occupy the slot in said shaft, a ring for retaining such pivot-bar within the pulley, substantially as set forth.

6. In combination with a shaft, a pulley connected by universal joint thereto, guides for said pulley to maintain its rotation in the same plane, and idle-rollers for guiding the driving-belt to said pulley, substantially as described.

GEORGE R. MITCHELL.

Witnesses:
R. D. McDOUGAL,
M. WESLEY BLACK.